(12) United States Patent
Ahn et al.

(10) Patent No.: US 7,792,371 B2
(45) Date of Patent: Sep. 7, 2010

(54) METHOD AND DEVICE FOR GENERATING IMAGE CODE AND METHOD AND DEVICE FOR DECODING IMAGE CODE

(75) Inventors: Jae Won Ahn, Goyang (KR); Cheol Ho Cheong, Seoul (KR); Tack Don Han, Seoul (KR); Sang Yong Lee, Seoul (KR)

(73) Assignees: Colorzip Media, Inc., Seoul (KR); Colorzip Technology Co., Ltd., Seoul (KR)

( * ) Notice: Subject to any disclaimer, the term of this patent is extended or adjusted under 35 U.S.C. 154(b) by 979 days.

(21) Appl. No.: 11/591,463

(22) Filed: Nov. 2, 2006

(65) Prior Publication Data

US 2007/0098215 A1    May 3, 2007

(51) Int. Cl.
G06K 9/36    (2006.01)
(52) U.S. Cl. .................. 382/232; 382/233; 382/238; 382/246
(58) Field of Classification Search ........... 382/232, 382/233, 238, 246; 348/409.1; 358/426.13, 358/426.02; 712/23, 206, 212; 714/755, 714/752; 375/308
See application file for complete search history.

(56) References Cited

U.S. PATENT DOCUMENTS 4,829,525 A * 5/1989 Sugiyama et al. ........... 714/758
7,434,135 B2 * 10/2008 Yoshida ..................... 714/752
7,543,213 B2 * 6/2009 Lin ........................... 714/755

FOREIGN PATENT DOCUMENTS

| JP | 10-320497 | 12/1998 |
|---|---|---|
| JP | 2005-208843 | 8/2005 |
| KR | 10-2006-0044805 | 5/2006 |
| KR | 10-2006-0044806 | 5/2006 |

OTHER PUBLICATIONS

PCT International Search Report dated Feb. 20, 2007 from the Korean Intellectual Property Office.
Office Action received for JP Patent Application No. 2006-300984.

* cited by examiner

*Primary Examiner*—Anh Hong Do
(74) *Attorney, Agent, or Firm*—Nixon & Vanderhye PC

(57) ABSTRACT

A method and device for generating and decoding an image code without a direction finder pattern are provided. In the method of generating an image code, a two-dimensional image is generated by encoding the configured basic information and the error correction information, and disposing the encoded basic and error correction information in predetermined regions, respectively. It is determined whether the two-dimensional image can be decoded for directions which are different from a basic direction of the two-dimensional image, respectively, and the two-dimensional image is output as a physical or electronic image code when a result from decoding for the directions which are different from the basic direction of the two-dimensional image is the same as a decoding result for the basic direction, or when decoding cannot be performed for a direction which is different from the basic direction. In the method of decoding an image code, a physically or electronically represented image code is received as an input, and a decoding result for a direction for which the decoding result has the least number of errors from among the results decoded for each direction is output. Accordingly, a direction of an image code can be detected without any overhead or with a minimal overhead.

18 Claims, 8 Drawing Sheets

| REFERENCE CODE DIRECTION | EXAMPLE OF ADDITIONAL INFORMATION | EXAMPLE OF REPRESENTATION OF ADDITIONAL CODE CELL ||||| 
|---|---|---|---|---|---|---|
| | | COLOR | LETTER | NUMBER | FIGURE | IMAGE |
| 0 DEGREE | 00(2) | RED | N | 0 | ↑ | JUJACK |
| 90 DEGREE | 01(2) | BLUE | E | 1 | → | BACKHO |
| 180 DEGREE | 10(2) | BLACK | S | 2 | ↓ | HYUNMU |
| 270 DEGREE | 11(2) | WHITE | W | 3 | ← | CHUNGRYUNG |

CODE IMAGE     CODE CELL     EXTRA INFORMATION REGION

FIG. 4A 6 x 6 CELLS ENCODING

FIG. 4B 8 x 8 CELLS ENCODING

FIG. 4C

ENCODING WITH CONSIDERATION
OF EDGE ERROR

PARITY- NUMBER OF CHECK SYMBOLS : $n-k = 2t$ (SYMBOL)
MINIMAL DISTANCE = $d_{min} = 2t+1 = n-k+1$ (SYMBOL)

METHOD AND DEVICE FOR GENERATING IMAGE CODE AND METHOD AND DEVICE FOR DECODING IMAGE CODE

CROSS-REFERENCE TO RELATED PATENT APPLICATION

This application claims the benefit of Korean Patent Application No. 10-2005-0105065, filed on Nov. 3, 2005, in the Korean Intellectual Property Office, the disclosure of which is incorporated herein in its entirety by reference.

BACKGROUND OF THE INVENTION

1. Field of the invention

The present invention relates to a method and device for generating and decoding an image code, and more particularly, to a method and device for generating an image code, a direction of which is searchable without any overhead such as a direction finder pattern or with a minimal overhead and a method and device for decoding the image code.

2. Description of Related Art

Methods of providing a service corresponding to a code by recognizing a one-dimensional bar code or a two-dimensional image code by means of a camera, a scanner, or the like have been researched. Recently, an image code, a radio frequency identification (RFID) tag, or the like is used as a means for designating an identification number to an object and recognizing the identification number, as ubiquitous computing environments becomes more pervasive. Image codes can be mass-produced, are inexpensive, and can be recognized by a multi-purpose device such as a cellular phone embedding a camera, and accordingly image codes attract much attention.

In order to recognize the image code, generally, decoding including searching for a code image printed on a physical medium, recognizing each cell or pattern in the searched image, and extracting information and error-correction information are performed.

An image code should be searched from an image input through a camera, etc., a specially defined pattern, which can be recognized as an image code, is applied to the image code. For example, for the recognition of a rotation angle and a pattern of an image code, a guard pattern is used in a one-dimensional bar code, and a finder pattern is used in a two-dimensional bar code. The decoding of the image code is performed by extracting the pattern.

In the case where a quick response (QR) code, which is one of the two-dimensional image codes, is applied, large rectangular finder patterns located in three corners are used. In the case where a data matrix code is applied, two neighboring solid bars located in left and lower corners of a rectangular code are used. When a maxicode is applied, a special pattern located on the center called a bullseye is used, and when PDF417 is applied, a pattern similar to a bar code is used.

The patterns used in the codes are different in shape and size and have merits and demerits, however, the patterns have a common disadvantage in that the patterns should be added in a code region as an overhead. In order to decrease the overhead, a method of using a very small pattern such as a dot can be used. However, when the dot is damaged or lost, the direction of the code cannot be detected. On the contrary, when the pattern is enlarged to improve a characteristic of direction detection capability, a code ratio, which is a ratio of the amount of information to an area of the total region, is decreased, thus making the image code inefficient.

Once a region of the image code is extracted and the direction of the image code can be recognized, information is extracted by a decoding process using an error processing method such as a parity method, a checksum, and a cyclic redundancy check (CRC). Generally, in the two-dimensional code, a Reed-Solomon algorithm is used for encoding in order to increase error tolerance. In addition, a Bose-Chaudhuri-Hocquenghem (BCH) algorithm may also be used.

SUMMARY OF THE INVENTION

The present invention provides a method and device for generating an image code, the direction of which can be detected without any overhead such as a direction finder pattern or with a minimal overhead.

The present invention also provides a method and device for decoding an image code without any overhead or with a minimal overhead using an error correcting technique.

The present invention also provides a computer-readable medium having embodied thereon a computer program for the method of generating and decoding an image code.

According to an aspect of the present invention, there is provided a device for generating an image code comprising: an encoding unit generating a two-dimensional image by configuring basic information including at least one of a letter, a number, a symbol, and an image, and error correction information for correcting an error in the basic information, encoding the configured basic information and the error correction information, and disposing the encoded basic and error correction information in predetermined regions, respectively; a decoding determination unit determining whether the two-dimensional image can be decoded in directions which are different from a basic direction of the two-dimensional image, respectively; and a code generation unit outputting the two-dimensional image as a physical or electronic image code when a result of decoding in the directions which are different from the basic direction of the two-dimensional image is the same as a decoding result for the basic direction, or when decoding cannot be performed in a direction which is different from the basic direction.

According to another aspect of the present invention, there is provided a method of generating an image code, comprising: (a) generating a two-dimensional image by configuring basic information including at least one of a letter, a number, a symbol, and an image, and error correction information for correcting an error in the basic information, encoding the configured basic information and the error correction information, and disposing the encoded basic and error correction information in predetermined regions, respectively; (b) determining whether the two-dimensional image can be decoded in directions which are different from a basic direction of the two-dimensional image, respectively; and (c) outputting the two-dimensional image as a physical or electronic image code when a result of decoding in the directions which are different from the basic direction of the two-dimensional image is the same as a decoding result for the basic direction, or when decoding cannot be performed in a direction which is different from the basic direction.

According to another aspect of the present invention, there is provided a device for decoding an image code comprising: a code input unit receiving a physically or electronically represented image code as an input; a decoding unit decoding the image code in each recognizable direction; and a result selection unit outputting a decoding result for a direction for which the decoding result has the least number of errors from among the results decoded by the decoding unit.

According to another aspect of the present invention, there is provided a method of decoding an image code comprising: (a) receiving a physically or electronically represented image code as an input; (b) decoding the image code in each recognizable direction; and (c) outputting a decoding result for a direction for which the decoding result has the least number of errors from among the results decoded in each direction.

BRIEF DESCRIPTION OF THE DRAWINGS

The above and other features and advantages of the present invention will become more apparent by describing in detail exemplary embodiments thereof with reference to the attached drawings in which:

FIGS. 4A, 4B and 4C are diagrams illustrating an example of a method of disposing basic information and error correction information used by an encoding unit;

DETAILED DESCRIPTION OF THE INVENTION

Now, exemplary embodiments of the present invention will be described in detail with reference to the accompanying drawings.

Figures 1, 2:
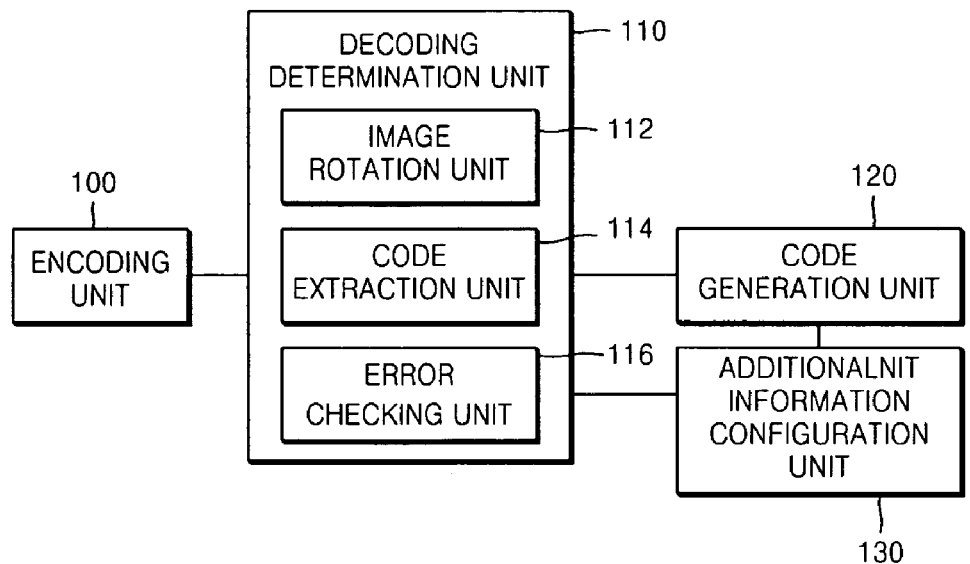
FIG. 1 is a block diagram illustrating a device for generating an image code according to an embodiment of the present invention.
FIG. 2 is a diagram illustrating an embodiment of representing additional information by using an additional information cell.

FIG. 1 is a block diagram illustrating a device for generating an image code according to an embodiment of the present invention.

Referring to FIG. 1, the device for generating an image code includes an encoding unit 100, a decoding determination unit 110, a code generation unit 120, and an additional information configuration unit 130. In addition, the decoding determination unit 110 includes an image rotation unit 112, a code extraction unit 114, and an error checking unit 116.

The encoding unit 100 configures basic information comprised of at least one of a letter, a number, a symbol, and an image, and configures error correction information used for correcting an error in the basic information and generates two-dimensional image by encoding the configured basic information and error correction information and disposing the encoded basic information and error correction information in basic information and error correction regions, respectively.

The basic information region is located in a predetermined area of an image comprising the image code. The encoding unit 100 converts the basic information into a code comprising a color, shading, brightness, figure, pattern, or combination of these elements. In other words, the basic information, as content which is displayed as a letter, number, symbol, special character, image, or the like is converted into a color, shading, brightness, figure, pattern, or combination of these elements according to a predetermined code table and is disposed in the basic information region.

The error correction information region is located in the image code while being separated from or overlapping the basic information region. And the encoding unit 100 converts the error correction information into a code including a color, shading, brightness, figure, pattern, or combination of these elements and disposes the converted code on the error correction information region.

The image code according to an embodiment of the present invention may further include an additional information region together with the basic information region and the error correction information region. A detailed explanation of a mixed code, in which the basic information region and the error correction information region are overlaid so as to be displayed, is disclosed in Korean Patent Application No. 2005-25239, titled "Mixed Code and Method and Device for Encoding Mixed Code" and Korean Patent Application No. 005-25240, titled "Method and Device for Decoding Mixed Code".

In the case where each cell is disposed in the image code, a method of disposing the cell for a high recognition efficiency in recognizing the image code by means of a camera or the like should be used. Generally, an error correction code which is acquired by encoding the error correction information is disposed in a two-dimensional image in units of cells, and decoding is performed in units of symbols, which is usually 1 byte comprising 8 bits, and accordingly, the capability of error correction is represented in the number of restorable symbols. In other words, there are various designing methods for encoding, and various aspects of performance can be improved by using an appropriate designing method.

Figure 3A:
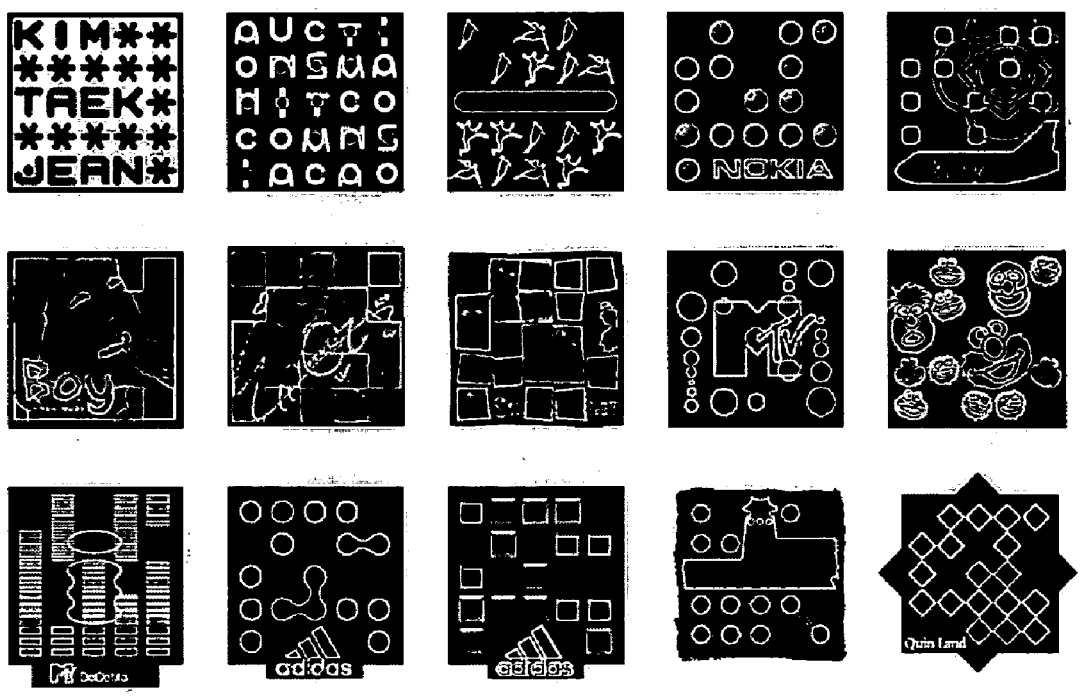
FIGS. 3A and 3B are an embodiment of an image code according to an embodiment of the present invention.
Figure 3B:
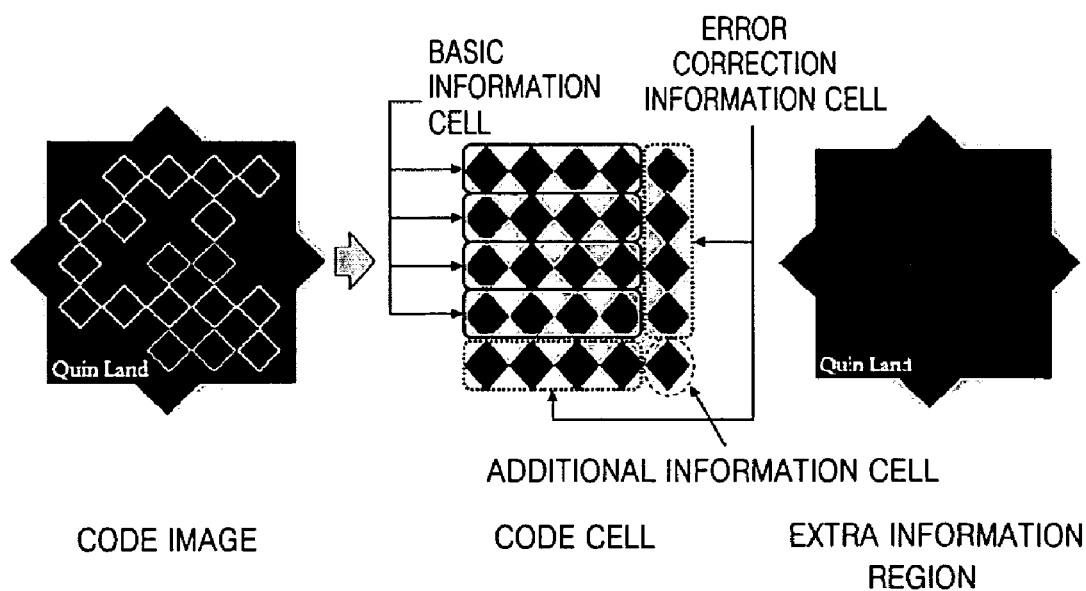
Figure 7A:
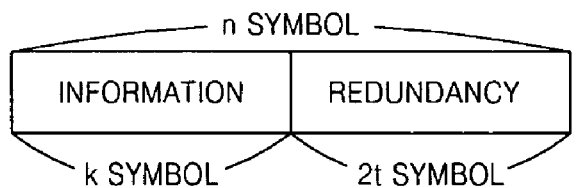
FIG. 7A is a diagram illustrating a parameter of a Reed-Solomon code.

In addition, the number of bits per cell when using a color code is an important factor in encoding. In regard to an image code as illustrated in FIG. 3B, when the basic information includes four symbols each of which includes four cells, the error correction information includes two symbols, and the Reed-Solomon code is used, the number of symbols which can be corrected using the error correction information is one. The parameters of the Reed-Solomon code are illustrated in FIG. 7A.

As an example, a method of disposing the basic information and the error correction information into cells is illustrated in FIG. 4. When the image code is designed so as to improve the capability of error correction while a square is maintained, as illustrated in FIG. 4A, the number of error correction symbols of the code becomes four from among nine symbols, which can be represented as (9,4), and the capability of error correction becomes two. In the case illustrated in FIG. 4B, the code becomes (12,4), and the capability of error correction becomes four.

In the (6,4) code illustrated in FIG. 3B, the tolerance for a vertical error is smaller than for a horizontal error. And accordingly, when the symbols are grouped to form a square as illustrated in FIGS. 4A and 4B, the tolerances for the horizontal/vertical errors become the same.

When an image code is input by using a camera or the like, much data distortion occurs in an edge portion of the image code, and when symbols are grouped as illustrated in FIG. 4C, the number of symbols contacting the edge portion becomes five, which is smaller than the eight illustrated in FIG. 4A, so as to remove an environmental error occurring factor.

The decoding determination unit 110 determines whether the two-dimensional image generated by the encoding unit 100 can be decoded in another direction.

More specifically, the image rotation unit 112 rotates the two-dimensional image generated by the encoding unit 100 in a direction, which is different from a basic direction of the two-dimensional image, in order for it to be recognized. For example, a two-dimensional rectangular image including 5×5 cells can be recognized in rotation directions of 90 degrees, 180 degrees, or 270 degrees.

The code extraction unit 114 respectively extracts codes corresponding to the basic information region and the error correction information region from the rotated two-dimensional image. For example in a two-dimensional image of 5×5 cells, when left upper 4×4 cells constitute the basic information region, and right 1×4 cells and lower 4×1 cells constitute the error correction information region, respectively, as illustrated in FIG. 3B, the code extraction unit 114 extracts codes located in the left upper basic information region and in the right and lower error correction information regions for decoding the two-dimensional image, respectively.

However, when the codes located in the basic information region and the error correction information region are extracted from the two-dimensional image in a changed direction, incorrect codes other than original codes are extracted thus making the decoding impossible, but in some cases, the incorrect codes may be decoded into incorrect values.

Accordingly, the error checking unit 116 checks whether the codes extracted for directions other than the basic direction of the two-dimensional image by the code extraction unit 114 are decodable. The two-dimensional image includes the error correction information, and accordingly, the error checking unit 114 checks whether the erroneous code extracted from the basic information region can be corrected using the code extracted from the error correction information region. For example, the information, "www.colorzip.com", is encoded in the basic information region, and a result from decoding the image code in a direction different from a basic direction in encoding may be corrected according to the error correction code to be an incorrect arbitrary value such as "33".

To sum up, a two-dimensional image in which basic information and error correction information are disposed in predetermined locations can be classified into 1) a case in which decoding in a direction different from a basic direction cannot be performed, 2) a case in which decoding from at least one direction different from the basic direction can be performed, and the decoded value is different from the original information, and 3) a case in which decoding from at least one direction different from the basic direction can be performed, and the decoded value is the same as the original information.

The code generation unit 120 generates and outputs a physical or electronic image code for the two-dimensional image in the cases in which it is determined that decoding in any direction different from the basic direction cannot be performed by the error checking unit 116, that is, the case where error correction cannot be done using the code extracted form the error correction information region, and decoding in at least one direction different from the basic direction can be performed, and the decoded value is the same as the original information.

The additional information configuration unit 130 represents information on the direction of the two-dimensional image by using an additional information cell of the two-dimensional image or additionally represents the information using a disposition method of cells constructing the image code, when a decoded value for a direction different from the basic direction is different from the original basic information.

When the additional information is configured by the additional information configuration unit 130, the code generation unit 120 generates and outputs an image code including the additional information cell.

An embodiment of representing the additional information by using the additional information cell is illustrated in FIG. 2. The additional information configuration unit 130 represents a reference direction of the image code as a predetermined color, pattern, figure, letter, or the like in the additional information cell or indicates a changed direction in which incorrect code values are obtained.

When the additional information is represented inside the image code, the additional information configuration unit 130 represents direction information of the image code using a direction of letters disposed in the two-dimensional image or a disposition order of the basic information cell and the error correction information cell. When the direction information of the image code is represented using a disposition order of the basic information and the error correction information cells, the disposition order is configured, so that only one code value can be obtained using a predetermined disposition method and decoding cannot be performed using a different disposition method. FIG. 3A is an embodiment of an image code according to an embodiment of the present invention.

Figure 5:
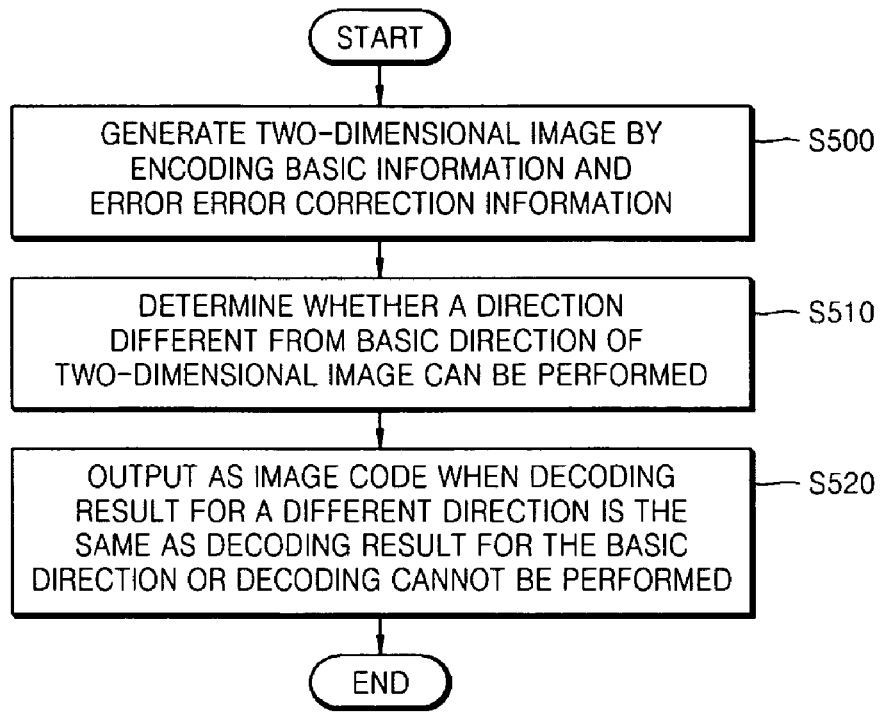
FIG. 5 is a flowchart illustrating procedures of a method of generating an image code according to an embodiment of the present invention.

FIG. 5 is a flowchart illustrating procedures of a method of generating an image code according to an embodiment of the present invention.

Referring to FIG. 5, the basic information and the error correction information are encoded in order to generate a two-dimensional image (Operation S500). In more detail, the basic information and the error correction information are arranged in the basic information region and the error correction information region using a predetermined disposition method so as to generate a two-dimensional image.

It is detected whether decoding in a direction which is different from the basic direction of the two-dimensional image can be performed (Operation S510). In more detail, the two-dimensional image is rotated to a recognizable direction which is different from the basic direction of the two-dimensional image so as to set the basic information region and the error correction information region and codes are extracted from the set basic and error correction information regions, which are to be set as new basic information and new error correction information. Also, decoding is performed based on the newly set basic and error correction information in order to detect an error. It is determined whether decoding cannot be performed based on the newly set basic and error correction information according to whether the error exceeds an error correctible amount.

Whether the decoding can be carried out is detected in all decodable directions other than the basic direction. At this time, when it is detected that the decoding can be carried out in a direction, it is detected whether a decoded value is the same as the original information.

When the decoding in all the directions other than the basic direction cannot be performed, or when the basic information is the same as the basic information for the basic direction even though the decoding can be performed, a physical or electronic image code for the two-dimensional image is generated and output (Operation S520).

When the decoded value for a direction which is different from the basic direction is different from the basic information, the additional information is configured, and the additional information is included by disposing the configured additional information in an additional information cell or rearranging cell units of the basic information and the error correction information. The additional information is configured when the number of decoded values resulting from the rotated image code is two or more. The additional information is for compensating for a result from decoding information other than the original basic information. Then an image code including the additional information cell is generated and output.

When the image code is generated, a white or colored extra margin can be set to make the image code easier to recognize, as necessary.

Figure 6:
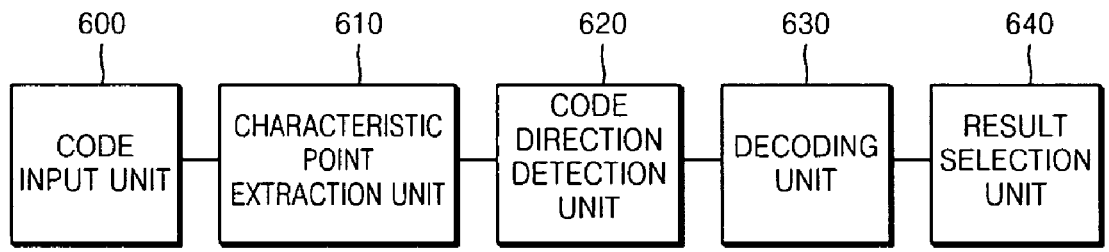
FIG. 6 is a block diagram illustrating a device for decoding an image code according to an embodiment of the present invention.

FIG. 6 is a block diagram illustrating a device for decoding an image code according to an embodiment of the present invention.

Referring to FIG. 6, the device for decoding an image code according to the current embodiment includes a code input unit 600, a characteristic point extraction unit 610, a code direction detection unit 620, a decoding unit 630, and a result selection unit 640.

The code input unit 600 receives as an input an image code physically represented by an image input device including a scanner, a camera, or the like or an image code electronically represented on-line or likewise.

The characteristic point extraction unit 610 extracts a characteristic point from an input image code. The characteristic point is an element forming a characteristic of the shape of the image code. For example, in a triangle, a rectangle, or the like, each vertex is the characteristic point.

The code direction detection unit 620 detects the direction of the input image code based on the extracted characteristic points. When the direction of the image code cannot be detected based on the extracted characteristic points, the code direction detection unit 620 sets a current angle to zero degrees and detects decodable directions of the image code. For example, when the image code is a triangular shape, the directions of the image code are the three directions of 0 degrees, 120 degrees, and 240 degrees. When the image code is a rectangle, the directions of the image code are four directions of 0 degrees, 90 degrees, 180 degrees, and 270 degrees.

When a direction of the image code is detected by the code direction detection unit 620, the decoding unit 630 performs decoding of the image code in the direction. On the other hand, when a direction of the image code cannot be detected, the decoding unit 630 performs decoding of the image code in all the decodable directions.

More specifically, the decoding unit 630 extracts codes corresponding to a basic information region and an error correction information region for each direction. When an error occurs in decoding the code extracted from the basic information region, the decoding unit 630 corrects the error using the code extracted from the error correction information region for decoding.

When the number of decodable directions is one, the result selection unit 640 outputs the result as a decoded value. On the other hand, when the number of decodable directions is two or more, the result selection unit 640 selects and outputs a resultant decoded value having a least number of errors. When the image code includes an additional information cell, the result selection unit 640 detects a direction of the image code using the additional information and outputs a decoded result for the direction.

Thereafter, an application (internet connection, outputting a letter, etc.) is applied to the decoded result.

Hereinafter, a case where the Reed-Solomon code is used as an error correction code of the image code will be explained in detail.

In a preparation operation of decoding, an outer shape of the image code is extracted, a rectangular shape is recognized, and a value of an internal cell of the image code is retrieved. At this time, since the image code is in the form of a matrix, it cannot be determined whether the image code retrieved by decoding is not rotated or whether it is rotated by 90 degrees, 180 degrees, or 270 degrees. In order to determine the rotation of the image code, in an embodiment of the present invention, the characteristics of the Reed-Solomon algorithm are used. Generally a method such as a Bose-Chaudhuri-Hocquenghem (BCH), a hamming code, a turbo code, or the like may be used in the case where the Reed-Solomon code is not applied as an error correction code.

FIG. 7A is a diagram illustrating a Reed-Solomon parameter. Referring to FIG. 7A, n is the number of symbols, and one symbol may include 8 bits, that is, one byte. n is a sum of the numbers of symbols of basic information and error correction information. In FIG. 7A, k is the number of symbols of the basic information, and t is the number of symbols of which an error can be corrected. Accordingly, the error correction information includes twice the number of symbols as the number of error-correctable symbols.

Figure 7B:
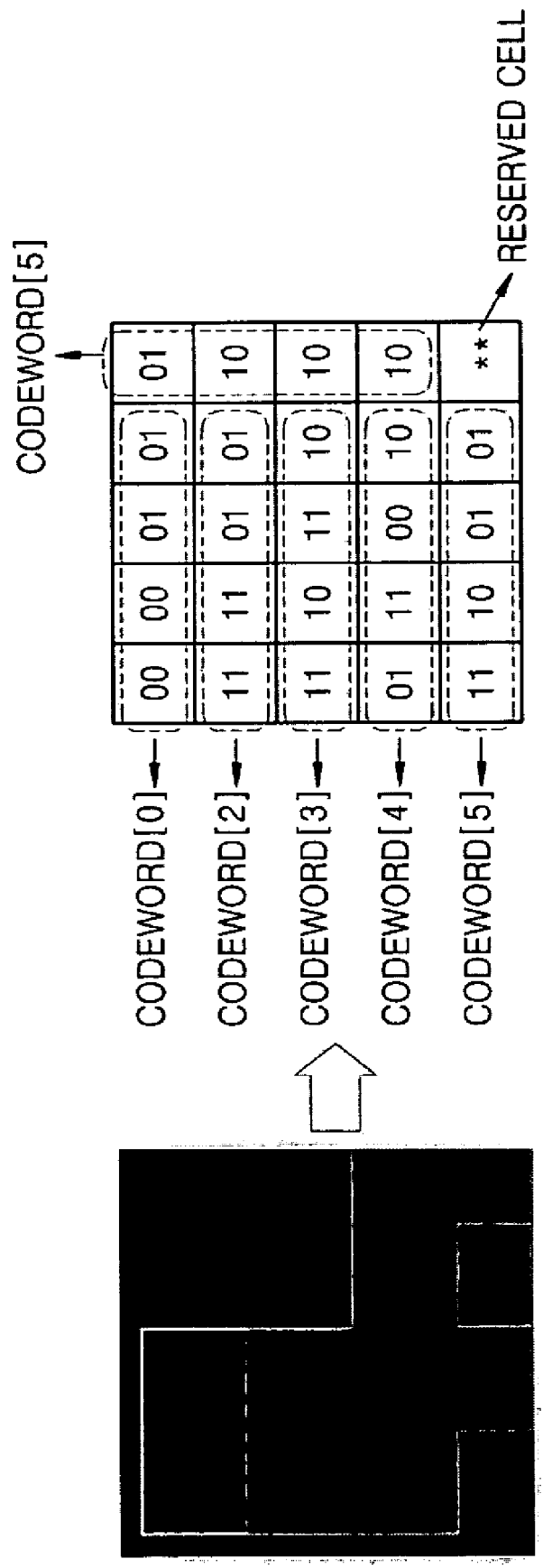
FIG. 7B is a diagram illustrating an image code using the Reed-Solomon code.

FIG. 7B is a diagram illustrating an image code using a Reed-Solomon code.

Referring to FIG. 7B, the image code includes 5×5 cells, and the Reed-Solomon parameter is (6,4), and accordingly n=6 bytes (total symbols) and k=4 bytes (basic information symbols), and the code cells can be extended. A right lower cell illustrated in FIG. 7B is a reserved cell. The reserved cell may be used to represent additional information according to an embodiment of the present invention or to store other information.

The error correction capability t is one byte (8 bits) which is the size of one symbol. When there is an error within the error correction capability t of the Reed-Solomon algorithm in decoding the image code in the current direction of the image code, the error is detected and corrected, the current direction of the image code is determined to be a basic direction, and a decoded result is output. On the other hand, when there is an error exceeding the error correction capability t in decoding the image code, the direction of the image code is changed to 90 degrees, and again it is detected whether the error occurring in the decoding is within the error correction capability t.

When the same method is applied to directions of 180 degrees and 270 degrees, one out of four times, there is a case where decoding can be performed within the error correction capability t, and the direction of the decoding in this case is the direction of the image code.

Figure 7C:
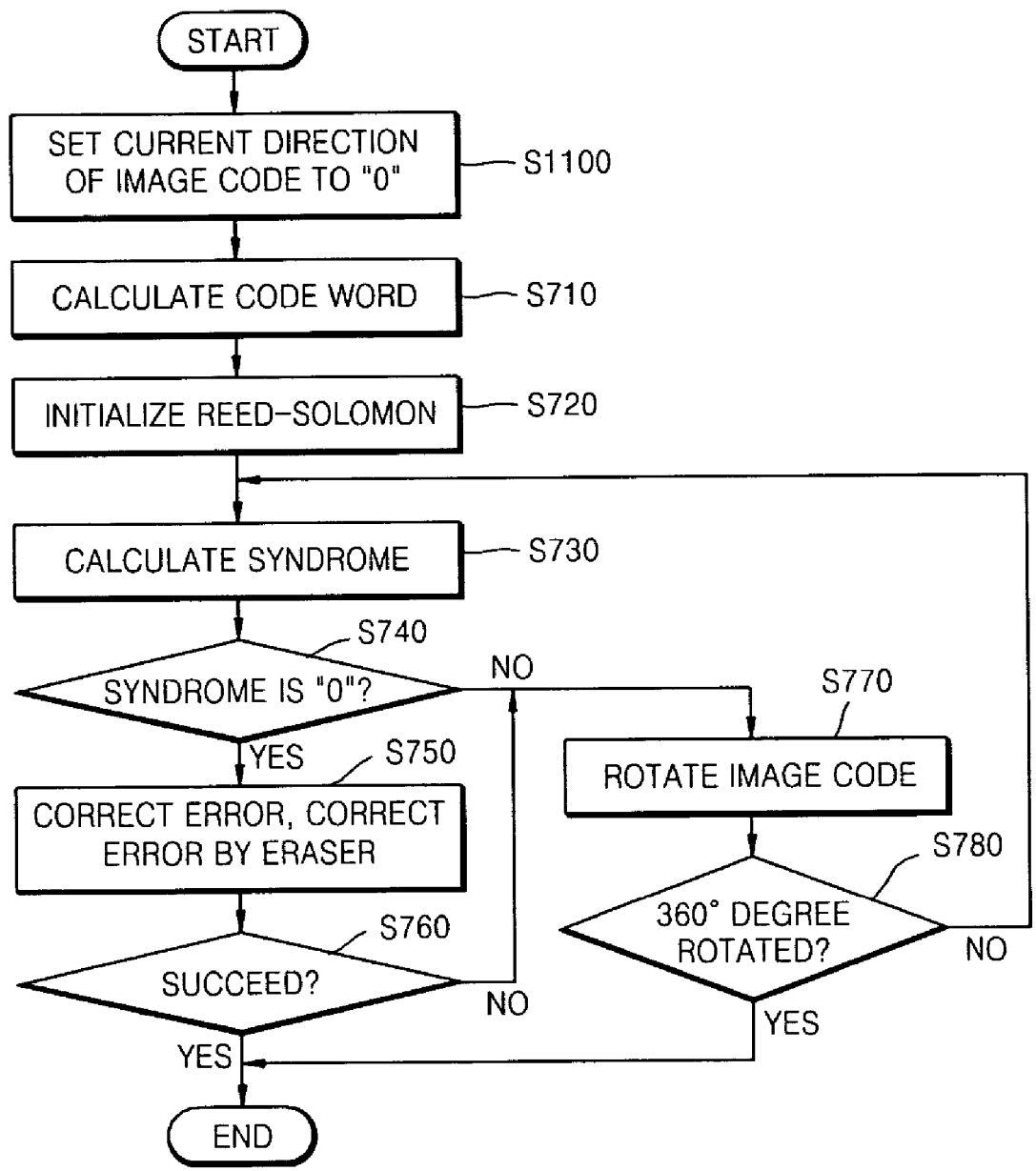
FIG. 7C is a flowchart illustrating a method of decoding an image code using the Reed-Solomon code according to an embodiment of the present invention.

FIG. 7C is a flowchart illustrating a method of decoding an image code using the Reed-Solomon code according to an embodiment of the present invention.

The method will now be explained based on the image code illustrated in FIG. 7B. A current direction of the image code is set to 0 degree (Operation S700). Symbols of the basic information, that is, a codeword, are calculated (Operation S710). Next, an initializing process for the Reed-Solomon algorithm is performed (Operation S720). It is checked whether there is an error in decoding using a syndrome (Operation S730).

When the syndrome is not zero (Operation S740), the image code is rotated (Operations S770 and S780). The syndrome is checked again (Operation S730). When the syndrome becomes zero (Operation S740), the error is corrected (Operation S750), and it is checked whether decoding of the image code can be performed (Operation S760). When the decoding cannot be performed, the image code is rotated again, and the procedures explained above are performed again.

In the image code illustrated in FIG. 7B, in the worst case scenario, the procedures illustrated in FIG. 7C are repeated four times (0 degrees, 90 degrees, 180 degrees, 270 degrees). However, when the following methods are used together to improve accuracy and recognition speed of decoding, the capability of the direction detection can be strengthened further.

(1) When the Reed-Solomon factor t is increased, that is, when the amount of error correction information is increased, the uniqueness of a decoded value at a time when the direction of the image code is rotated increases so as to strengthen the detection of the direction.

(2) When a color code is used, an additional information cell to which a third color, which is not used in a code, is applied can be used to strengthen the capability of the detection of the direction.

(3). When a shape of a code is changed to a shape other than a square, like for example a rectangle, etc., in designing the image code, the capability of the detection of the direction can be strengthened.

Figure 8:
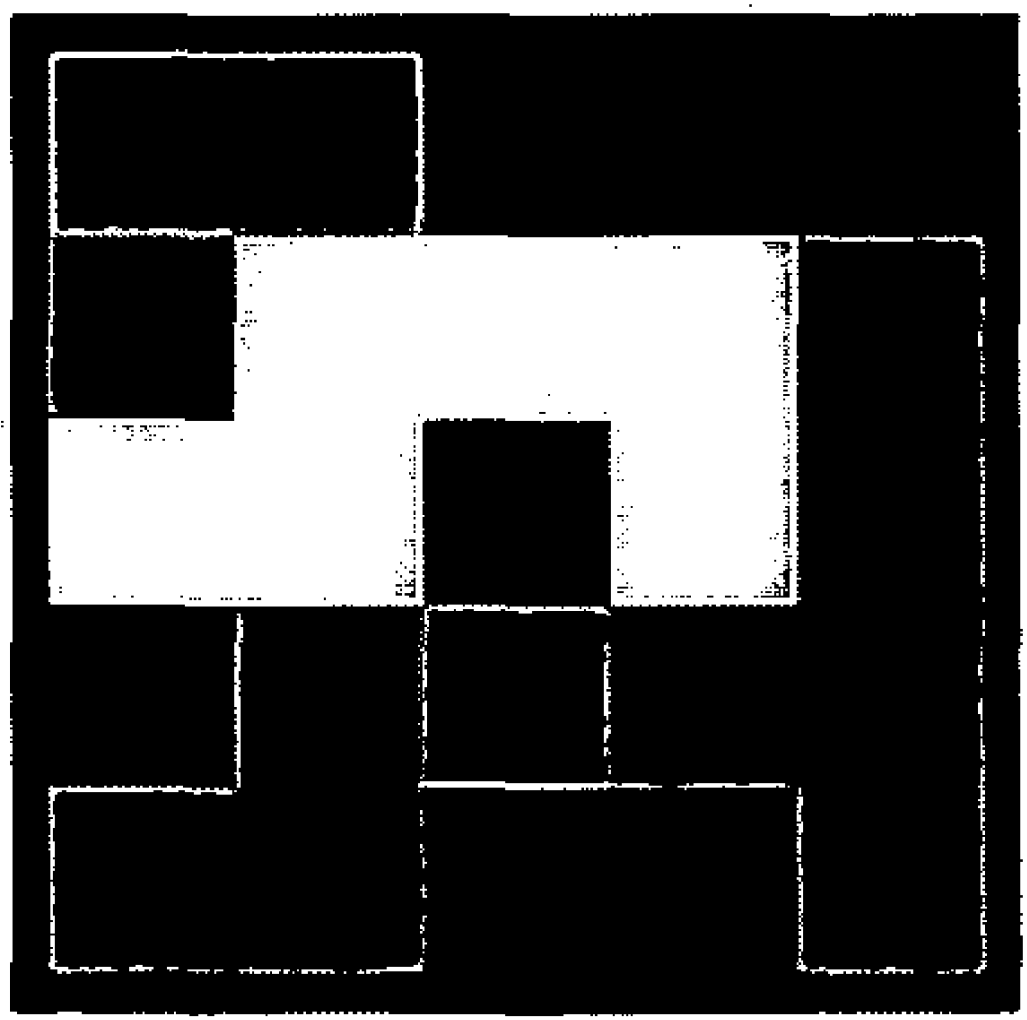
FIG. 8 is a diagram illustrating an example of a color code including white eraser information in a memory, which is incorrectly recognized.

Next, a method of improving the capability of error correction in decoding according to an embodiment of the present invention will be explained. FIG. 8 is a diagram illustrating an example of a color code including white eraser information in a memory which is incorrectly recognized.

There is a difficulty in recognizing a color of a color code due to a problem of color constancy, and accordingly, black-and-white code has been mostly used for two-dimensional code. In order to overcome the difficulty in recognizing a color, an eraser (an error with a known location), which is a correction function of the Reed-Solomon algorithm, is used in an embodiment of the present invention. When the recognition of a color is incorrect, the eraser of the Reed-Solomon algorithm marks the recognition of the color with an error, and solves the problem in decoding to help solve the problem of the color recognition efficiently.

Although the error correction capability t is mentioned in the above explanation, it is simply referred to as an error (or a failure), more precisely, errors can be classified into a random error v of which the location is not known and an error e of which the location is known. The errors can be represented in the following equation.

$$2v+e+1 \leq d_{min}$$

$$v+e/2 \leq t \quad \text{[Equation 1]}$$

When the eraser function of the Reed-Solomon algorithm is used in decoding, the erasers e twice as many as general random errors can be solved. When colors of cells of the image code illustrated in FIG. 7B are incorrectly recognized in regions for two symbols as illustrated in FIG. 8, that is, when a white color, which is not used in a color code, is mapped into two symbol regions (6 cells), the recognition is not handled as a fail in a recognition process, the symbol regions are marked with the eraser, and the decoding using the Reed-Solomon code proceeds.

The case explained above may happen frequently when a colored image code cannot be recognized. The case happens when a part of an image code is damaged due to the reflection of light into a camera, or when information of a cell cannot be correctly recognized due to ink, dyestuffs, dust, or the like.

In (6,4) code, up to two erasers can be corrected, and accordingly, the image code illustrated in FIG. 8 can be restored to its original color. Of course, when the number of erasers exceeds the capability of the eraser of the code, decoding cannot be performed. Accordingly, in that case, the algorithm explained above cannot be applied.

When the eraser function of the Reed-Solomon code is used as explained above, although the error correction capability is one symbol when the eraser function of the Reed-Solomon code is not used, up to two symbols can be restored. When the eraser is used, it is possible to restore twice as many errors as a case when the error correction is performed by mapping into an eraser and processing a part which is incorrectly recognized in color detection or pattern extraction is performed one by one for decoding.

In a black-and-white two-dimensional code, the eraser function of Reed-Solomon code is mainly used for damage to a code region including a spot, a scratch, or the like. Since there is no difficulty in recognizing a black or while color, which is an achromatic color, a case where a color is recognized incorrectly is not considered. However, consideration of this case is very important in recognizing a color or a pattern.

Figure 9:
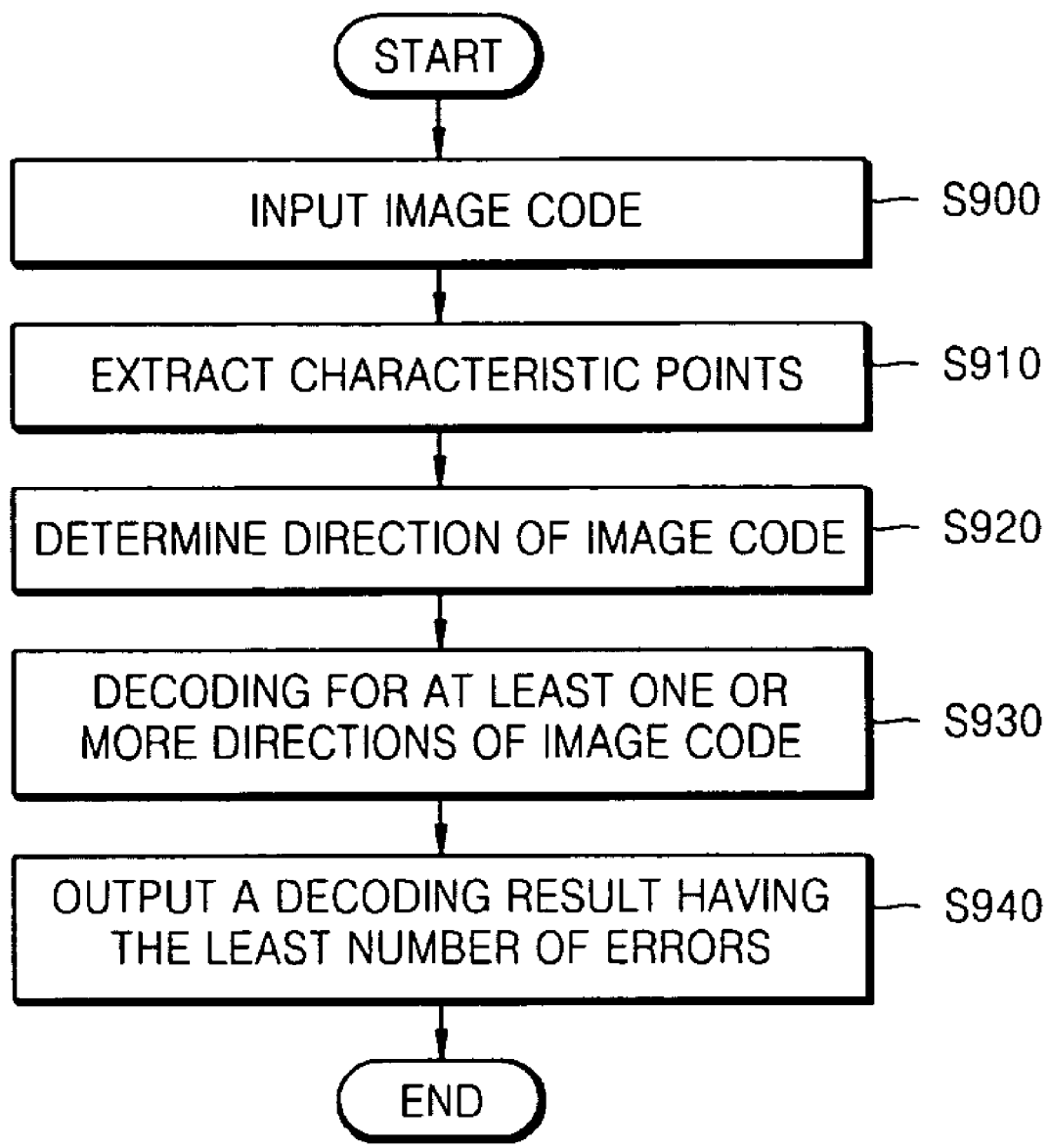
FIG. 9 is a flowchart illustrating a method of decoding an image code according to an embodiment of the present invention.

FIG. 9 is a flowchart illustrating a method of decoding an image code according to an embodiment of the present invention.

Referring to FIG. 9, a device for decoding an image code receives an image code as an input (Operation S900) and then extracts characteristic points from the image code (Operation S910). A direction of the image code is detected using the extracted characteristic points (Operation S920). When the direction of the image code is detected using the characteristic points, decoding is performed in the detected direction, and when the direction of the image code cannot be detected using the characteristic points, decoding is performed in all the decodable directions (Operation S930). Then a decoding result having the least number of errors among the decoding result is output (Operation S940).

The embodiments of the present invention can be written as computer programs and can be implemented in general-purpose digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

In a two-dimensional code using a conventional error correction code, additional logic which becomes an overhead is added in order to detect the direction of the image code. However, in the present invention, characteristics of a Reed-Solomon code are utilized to independently detect a changed direction and increase the amount of information included in the code. In addition, when an incorrect recognition occurs, decoding can be performed by processing a part where the error occurs using eraser information to improve the recognition capability.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A device for generating an image code comprising:
an encoding unit generating a two-dimensional image by configuring basic information including at least one of a letter, a number, a symbol, and an image, and error correction information for correcting an error in the basic information, encoding the configured basic information and the error correction information, and disposing the encoded basic and error correction information in predetermined regions, respectively;
a decoding determination unit determining whether the two-dimensional image can be decoded in directions which are different from a basic direction of the two-dimensional image, respectively; and
a code generation unit outputting the two-dimensional image as a physical or electronic image code when a result of decoding in the directions which are different from the basic direction of the two-dimensional image is the same as a decoding result for the basic direction, or when decoding cannot be performed in a direction which is different from the basic direction.

2. The device of claim 1, wherein the decoding determination unit comprises:
an image rotation unit rotating the two-dimensional image toward each direction that is to be recognized;
a code extraction unit respectively extracting codes corresponding to the basic information region and the error correction information region from each two-dimensional image which is rotated toward each recognizable direction; and
an error checking unit checking whether an error in the code extracted from the basic information region can be corrected based on the code extracted from the error correction region for each recognizable direction.

3. The device of claim 1 further comprising an additional information configuration unit encoding additional information in the basic direction or in a direction for which a decoding result is different from a decoding result for the basic direction and placing the encoded additional information in a side of the two-dimensional image when the result from decoding in the direction which is different from the basic direction is different from the decoding result for the basic direction, and
wherein the code generation unit generates an image code including additional information.

4. A method of generating an image code, comprising:
(a) generating with an encoding unit a two-dimensional image by configuring basic information including at least one of a letter, a number, a symbol, and an image, and error correction information for correcting an error in the basic information, encoding the configured basic information and the error correction information, and disposing the encoded basic and error correction information in predetermined regions, respectively;
(b) determining with a decoding determination unit whether the two-dimensional image can be decoded in directions which are different from a basic direction of the two-dimensional image, respectively; and
(c) outputting with a code generation unit the two-dimensional image as a physical or electronic image code when a result of decoding in the directions which are different from the basic direction of the two-dimensional image is the same as a decoding result for the basic direction, or when decoding cannot be performed in a direction which is different from the basic direction.

5. The method of claim 4, wherein (b) comprises:
(b1) rotating the two-dimensional image toward each direction that is to be recognized;
(b2) extracting codes corresponding to the basic information region and the error correction information region respectively from each two-dimensional image which is rotated toward each recognizable direction; and
(b3) checking whether an error in the code extracted from the basic information region can be corrected based on the code extracted from the error correction region in each recognizable direction.

6. The method of claim 4, wherein (b) further comprises encoding additional information in the basic direction or in a direction for which a decoding result is different from a decoding result for the basic direction and placing the encoded additional information in a side of the two-dimensional image when the result from decoding in the direction which is different from the basic direction is different from the decoding result for the basic direction, and
wherein (c) comprises generating an image code including the additional information.

7. A computer-readable medium having embodied thereon a computer program for the method of claim 4.

8. A device for decoding an image code comprising:
a code input unit receiving a physically or electronically represented image code as an input;
a characteristic point extraction unit extracting characteristic points which can form characteristics of a shape of the image code; and
a code direction detection unit detecting a direction of the image code by using the characteristic points and determining all recognizable directions when the direction of the image code cannot be detected;
a decoding unit decoding the image code in each recognizable direction; and
a result selection unit outputting a decoding result for a direction for which the decoding result has the least number of errors from among the results decoded by the decoding unit.

9. The device of claim 8, wherein the code input unit receives the image code to which Reed-Solomon code is applied as an error correction code as an input.

10. The device of claim 8, wherein the decoding unit decodes the image code using an eraser correcting function of the Reed-Solomon code.

11. A method of decoding an image code comprising:
(a) receiving a physically or electronically represented image code from an encoding unit as an input;
(b) decoding the image code in each recognizable direction; and
(c) outputting with a code generation unit a decoding result for a direction for which the decoding result has the least number of errors from among the results decoded in each direction,
wherein (b) comprises:
(b1) a characteristic point extraction unit extracting characteristic points which can form characteristics of a shape of the image code; and
(b2) a code direction detection unit detecting a direction of the image code by using the characteristic points and determining all recognizable directions when the direction of the image code cannot be detected.

12. The method of claim 11, wherein (b) comprises: extracting codes corresponding to a basic information region and an error correction information region for each direction and correcting the error in the code extracted from the basic information region using the code extracted from the error correction information region.

13. The method of claim 11, wherein the image code is applied with Reed-Solomon code as an error correction code as an input.

14. The method of claim 11, wherein (b) comprises decoding an additional information region including direction information of the image code, and wherein (c) comprises outputting a decoding result for a direction of the image code which is obtained from the additional information.

15. The method of claim 11, wherein (b) comprises decoding the image code using an eraser correcting function of the Reed-Solomon code.

16. A computer-readable medium having embodiment thereon a computer program for the method of claim 11.

17. A device for decoding an image code comprising:

a code input unit receiving a physically or electronically represented image code as an input;

a decoding unit decoding the image code in each recognizable direction; and a result selection unit outputting a decoding result for a direction for which the decoding result has the least number of errors from among the results decoded by the decoding unit;

wherein the decoding unit extracts codes corresponding to a basic information region and an error correction information region for each direction and corrects the error in the code extracted from the basic information region using the code extracted from the error correction information region.

18. A device for decoding an image code comprising:

a code input unit receiving a physically or electronically represented image code as an input;

a decoding unit decoding the image code in each recognizable direction; and a result selection unit outputting a decoding result for a direction for which the decoding result has the least number of errors from among the results decoded by the decoding unit;

wherein the decoding unit decodes an additional information region including direction information of the image code, and wherein the result selection unit outputs a decoding result for a direction of the image code which is obtained from the additional information.

* * * * *